United States Patent

Hilditch

[11] 3,746,855
[45] July 17, 1973

[54] ELECTRON MICROSCOPES
[75] Inventor: David Henry Hilditch, Isle of Skye, Scotland
[73] Assignee: Associated Electrical Industries Limited, London, England
[22] Filed: Oct. 27, 1971
[21] Appl. No.: 192,856

[30] Foreign Application Priority Data
Oct. 28, 1970 Great Britain............... 51,190/70

[52] U.S. Cl.......................... 250/49.5 A, 250/396
[51] Int. Cl....................... H01j 37/26, G01n 23/04
[58] Field of Search.................. 250/49.5 A, 49.5 D, 250/49.5 C

[56] References Cited
UNITED STATES PATENTS
3,597,608   8/1971   Gutter........................... 250/49.5 A

*Primary Examiner*—Walter Stolwein
*Assistant Examiner*—C. E. Church
*Attorney*—Thomas E. Fisher

[57] ABSTRACT

In an electron microscope comprising an electromagnetic objective lens and at least three separate electromagnetic projector lenses, the rotations produced by the lenses are mutually balanced out, so that the final image has a substantially constant orientation with changes in magnification. Preferably, magnification is set by a single control knob. Preferably, the microscope has two modes of operation, for different magnification ranges, the rotations being balanced out in both ranges.

7 Claims, 5 Drawing Figures

ELECTRON MICROSCOPES

This invention relates to electron microscopes.

It is known to provide an electron microscope having an electromagnetic objective lens, and three or more separate elctromagnetic projector lenses operating in electron optical series. The use of three or more separate projector lenses (instead of one or two as in early electron microscopes) allows a wide range of magnifications to be obtained without significant distortion of the image.

In operation, an electromagnetic electron optical lens, as well as having a focussing effect on an electron beam passing through it, also causes the electron beam to be rotated about the lends axis. Both the focal length of the lens and the rotation imparted by it are functions of the lens excitation current, and therefore whenever the focal length is varied the amount of rotation produced by the lens also changes. As a result, in known three-projector electron microscopes, whenever the lens excitation currents are varied to alter the magnification of the microscope, the orientation of the final image changes. This is inconvenient from the point of view of the microscope operator.

It has been proposed in U.S. Pat. No. 2,323,328 to form an electromagnetic electron optical lens having two pole gaps and two windings for producing magnetic fields in the respective pole gaps. By applying excitation currents to the windings in opposite senses the beam rotations in the two halves of the lens can be made to balance out, so that the net rotation produced by the lens is zero. The arrangement described in that specification, however, is a single-projector microscope, and is therefore incapable of operating over a wide range of magnifications without distortion. Moreover, applying the teaching of that specification to a three-projector microscope would involve making each projector lens a double-gap lens, which would be very uneconomical.

One object of the present invention is to overcome the problem of image rotation in a three (or more)-projector electron micropscope without the necessity for making each projector lens a double-gap lens.

According to the invention, there is provided an electron microscope having an electromagnetic objective lens and at least three separate electromagnetic projector lenses disposed electron optically in series, and supply means for applying excitation currents to said lenses, said supply means having a control which when operated causes the magnification of the microscope to be varied by varying the amplitudes of the excitation currents applied to two or more of said lenses in such a manner that changes in beam rotation in said lenses are of opposite sense and tend to balance each other out, so that the final image has substantially constant orientation, at least over a range of values of magnification.

Conveniently, the lens excitation currents are such that the net rotation of the final image with respect to the object is substantially zero, at least over said range of values of magnification.

In a preferred arrangement in accordance with the invention, said supply means is so arranged that the magnification of the microscope is varied over a first range of values by varying the excitation currents applied to a first combination of said lenses in such a manner that changes in beam rotation in the lenses of said first combination of lenses balance each other out, and the magnification of the microscope is varied over a second range of values by varying the excitation currents applied to a second combination of said lenses in such a manner that changes in beam rotation in the lenses of said second combination balance each other out. In this way, rotation can be balanced out over a wide range of values of magnification.

Preferably, the magnification of the microscope is varied by varying the excitation currents applied to two or more of said projector lenses, and simultaneously varying the excitation current applied to said objective lens so as to keep the object in focus, in such a manner that changes in beam rotation in said objective lens and said projector lenses balance each other out.

An electron microscope in accordance with the invention will now be described, by way of example, with reference to the accompanying drawings, of which:

Figure 1:
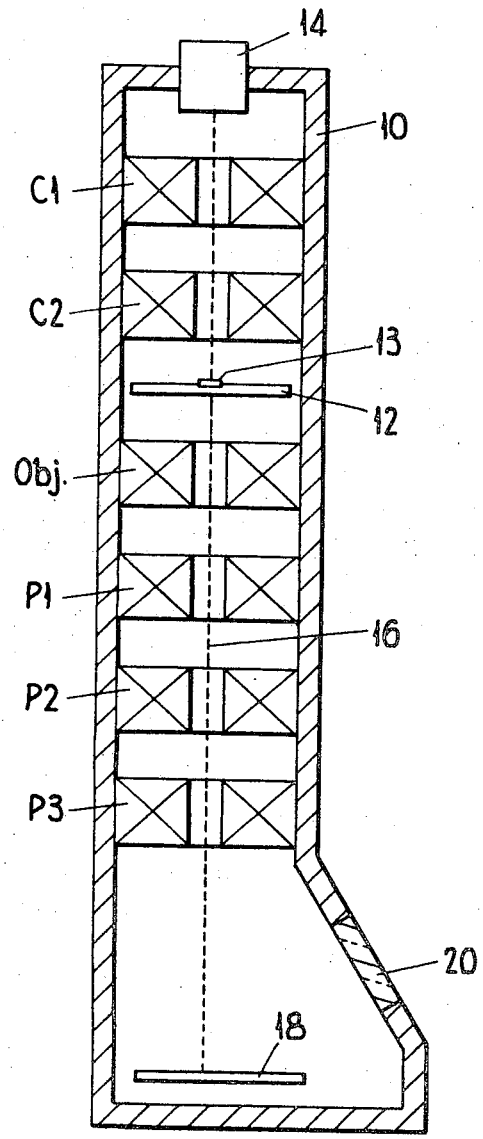
FIG. 1 is a highly schematic sectional view of the microscope.

Referring to FIG. 1, the microscope comprises an elongated evacuable housing 10, having a specimen stage 12 for supporting a specimen 13 within the housing. An electron gun 14 at one end of the housing 10 produces a beam 16 of electrons directed along the axis of the housing. The beam 16 passes through a pair of condenser lenses C1, C2 which focus the beam to a small spot for illuminating the specimen 13.

Electrons which pass through the specimen are focussed by an electromagnetic objective lens Obj, and three electomagnetic projector lenses P1, P2 and P3 to form an enlarged image of the specimen on a fluorescent screen 18. The screen 18 is viewable through a window 20 in the housing 10.

(The first two projector lenses P1 and P2 are sometimes referred to as intermediate lenses).

Figure 2:
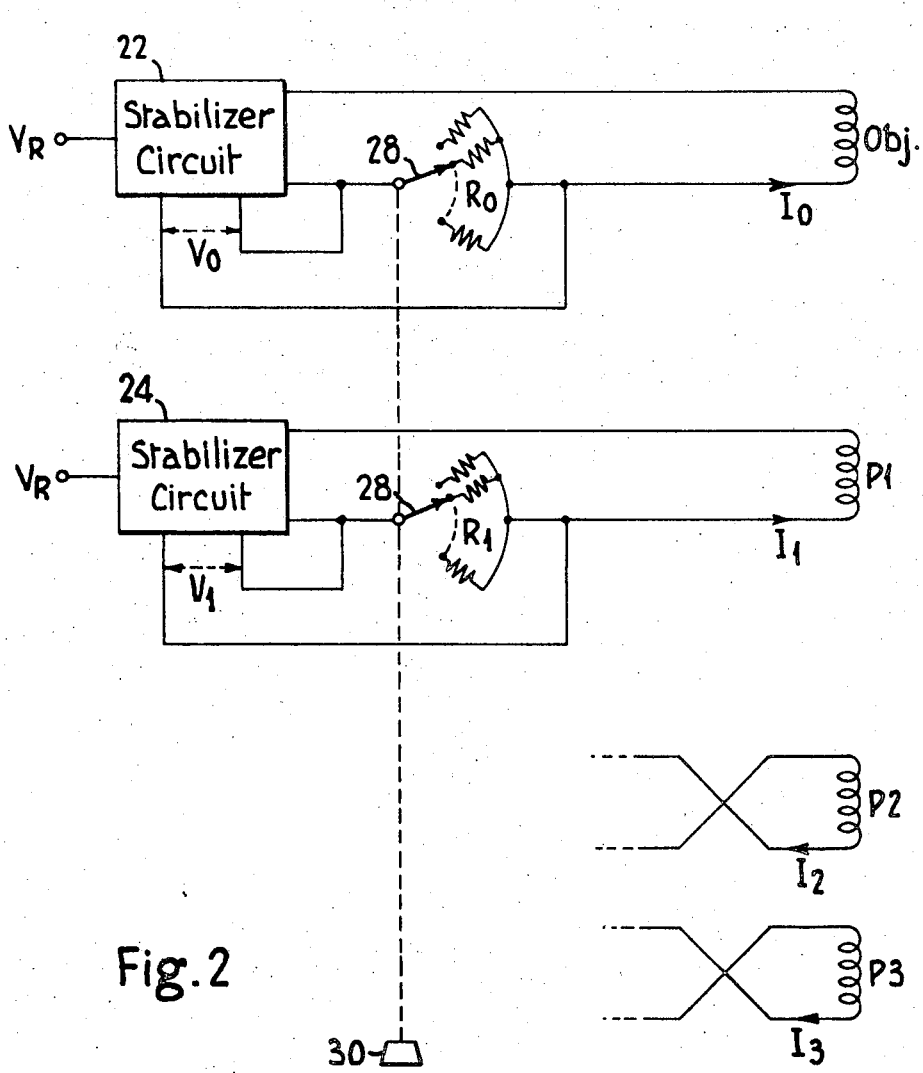
FIG. 2 illustrates the method of supplying excitation current to the microscope lenses.

Referring to FIG. 2, the excitation winding of the Objective lens Obj is supplied with excitation current by way of a stabiliser circuit 22, through a series resistance Ro. The stabiliser circuit 22 compares the voltage $V_o$ developed across the resistance $R_o$ with a fixed reference voltage $V_R$, and adjusts the value of the excitation current $I_o$ until the voltage $V_o$ is equal to $V_R$.

Thus it will be seen that the excitation current $I_o$ is stabilised at a value $I_o = V_R/R_o$, which is dependent upon the value of the resistance Ro.

The three projector lenses P1, P2 and P3 are supplied with excitation currents in a similar manner, by way of respective stabiliser circuits 24, through respective series resistances $R_1$, $R_2$ and $R_3$. (For simplicity the stabiliser circuits for P2 and P3, and the resistance $R_2$ and $R_3$ are not shown in the drawing). The excitation currents $I_1$, $I_2$ and $I_3$ through these lenses are thus stabilised at values $V_R/R_1$, $V_R/R_2$ and $V_R/R_3$ respectively.

As shown in FIG. 2, each of the resistances $R_o$-$R_3$ can be switched to any one of a set of discrete values, by means of a respective selector switch 28. The selector switches 28 are ganged together and are operable by means of a common control knob 30, which is calibrated in terms of magnification.

The value of each of the resistances $R_o$–$R_3$, and hence the value of each of the excitation currents $I_o$–$I_3$, is therefore a predetermined function of the position of the control knob 30.

Figure 3:
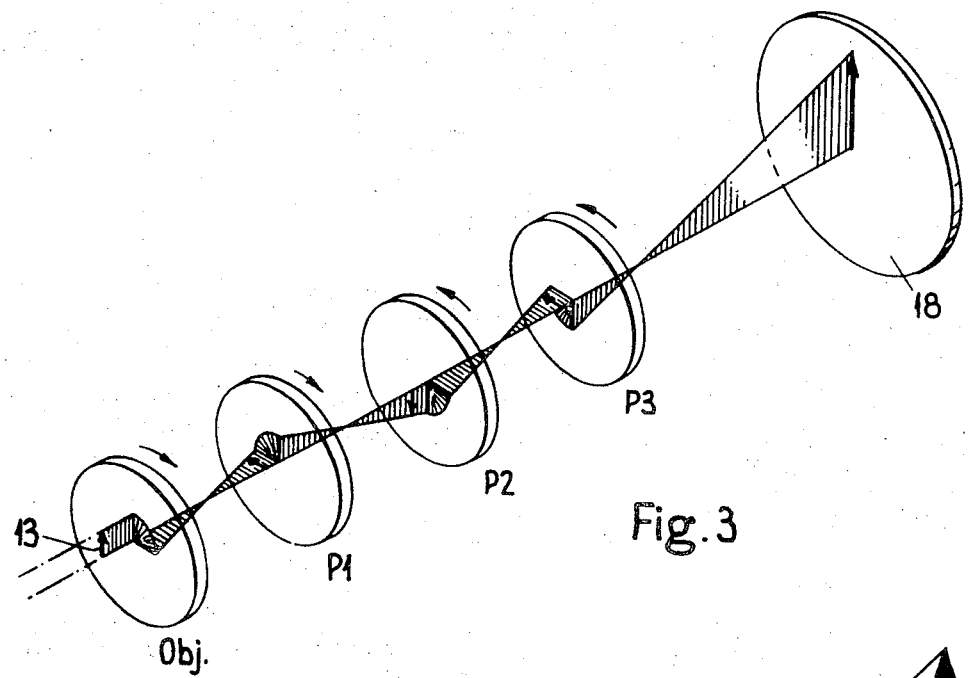
FIG. 3 is a schematic diagrammatic perspective view of the lens system of the microscope showing a typical electron trajectory in a first mode of operation.

Referring to FIG. 3, the microscope is arranged to operate as follows. Due to the fixed position of the specimen (i.e. the primary object) in the microscope, and in order to satisfy certain conditions concerning the required resolving power of the microscope, the excitation current applied to the objective lens Obj is maintained at a relatively high value, by a suitable choice of the resistance $R_o$. With this excitation current, the objective lens produces a rotation of approximately 100° as indicated schematically in FIG. 3.

In the first mode of operation of the microscope, excitation currents are applied to the projector lenses P1, P2 and P3 as follows. The excitation current applied to the third projector lens P3 is in such a sense that the rotation of the electron beam produced by this lens is in the opposite sense to that produced by the objective lens Obj. The value of the resistance $R_3$ which controls the excitation of P3 is such that this rotation is substantially equal in magnitude to that produced by the objective, and therefore balances out the rotation produced by the objective.

Similarly, the excitation currents applied to the lenses P1 and P2 are in mutually opposite senses, and the resistances $R_1$ and $R_2$ are such that, for any given setting of the control knob 30, the rotations produced by these lenses P1 and P2 are equal in magnitude. Thus the rotations produced by these two lenses also balance each other out.

Hence, the net rotation of the final image on the screen 18 with respects to the object is substantially zero.

Operation of the control knob 30 causes an adjustment of the values of the resistances $R_1$ and $R_2$ so as to vary the excitation currents flowing in the lenses P1 and P2. This causes a change in the magnification of the final image. The variations in the rotations in the lenses of P1 and P2 are equal in magnitude but in opposite senses. Hence, the net rotation produced by the lenses P1 and P2 remains zero, and the orientation of the final image is therefore unaffected by the magnification adjustment.

Operation of the control knob 30 also changes the value of the resistance $R_o$. This effects a small trimming adjustment of the excitation current in the objective lens in order to keep the specimen in focus at the new value of magnification. This trimming adjustment causes a small change in the rotation due to the objective lens, and this is therefore compensated by a corresponding small adjustment to the value of the resistors $R_3$. Since the projection lens P3 is operating near its minimum focal length, this change in excitation does not significantly affect the focal length of P3.

The maximum overall magnification achievable in this first mode of operation is determined by the minimum focal lengths of the lenses P1 and P2, and is typically of the order of 1.25 million times.

The minimum magnification in this mode of operation is limited by the geometric image aberrations which become large when the excitations of the lenses P1 and P2 approach low values. Typically, the minimum magnification in the first mode is of the order of 8,000 times, for an acceptable degree of aberration.

Figure 4:
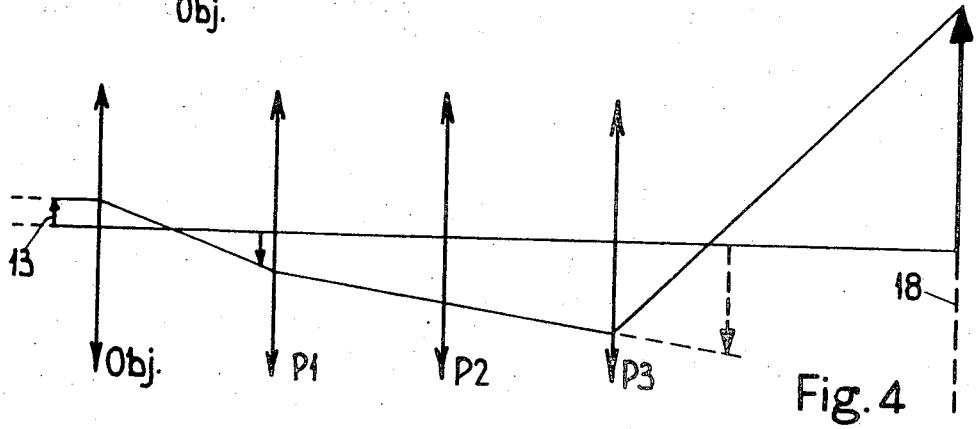
FIG. 4 is a schematic ray diagram of the microscope when operating in a second mode.

Referring now to FIG. 4, turning the control knob 30 to a value of magnification lower than the lower limit of the first mode of operation causes the microscope to operate in a second mode as follows.

The second projector lens P2 is disconnected from its current supply, so that it becomes inoperative.

The resistances $R_1$ and $R_2$ are set at values such that the first projector lens P1 operates in a virtual imaging mode, while the third projector lens P3 operates in a real imaging mode. Thus, the lens P1 produces "barrel" distortion, which tends to balance out the "pincushion" distortion produced by the lens P3 at low excitation. In this way, the magnification range of the microscope in the second mode can be extended, typically down to a value of 4,000 times, before geometric distortion becomes significant.

Operation of the control knob 30 varies the excitation currents in the lens P1 and P3, in order to vary the magnification, and at the same time causes a trimming adjustment to the objective lens Obj to keep the specimen in focus.

The values of the resistances $R_o$, $R_1$ and $R_3$ are so chosen that, at any particular magnification setting, the total rotation produced by the lenses P1 and P3 is equal to the rotation produced by the objective lens Obj, but in the opposite sense. Thus, the net rotation of the final image remains zero throughout the second mode of operation. (Rotation is not, of course, indicated in FIG. 4, which is purely a schematic ray diagram).

It will be seen that operation of the microscope in the two modes described permits a wide range of magnification to be achieved without appreciable distortion and without rotation of the image.

It should be appreciated that although in the particular example described above the net rotation of the final image is arranged to be zero, in other embodiments of the invention it may be arranged that the image rotation is held constant at some value other than zero over one or both ranges of magnification.

Figure 5:
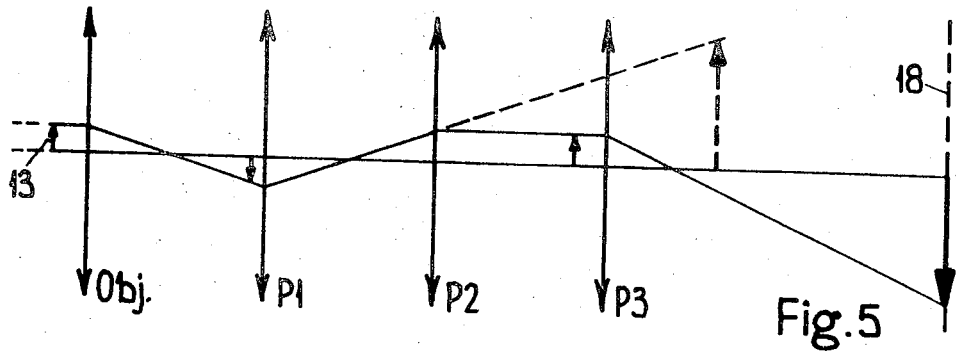
FIG. 5 is a schematic ray diagram of the microscope when operating in an alternative second mode.

Referring to FIG. 5, in one particular modification of the arrangement described above by way of example, the second mode of operation is replaced by an alternative mode as follows.

The magnification is varied by varying the excitation currents applied to the lenses P1 and P3. The values of the resistances $R_1$ and $R_3$ are so chosen that, at any particular magnification setting, the rotations produced by the lenses P1 and P3 are equal and opposite, and therefore balance each other out.

The lens P2 is operated in a virtual imaging mode, with constant weak excitation current. The lens P2 thus introduces "barrel" distortion into the system, which compensates for the "pincushion" distortion produced in the lens P3 when running at low excitation.

In this alternative second mode of operation, the rotation introduced by the objective lens Obj, which is of the order of 100°, is not cancelled out by the rotation introduced by the second projector lens P2, which being at a weak excitation contributes only about 10° rotation. Furthermore, as is apparent from FIG. 5, the final image is inverted, (i.e. rotated through − 180°) so that altogether the image is rotated through −90° with respect to the object. However, this rotation is substantially constant with variations in magnification, over the range 4,000 times to 8,000 times.

It will also be appreciated that, in alternative arrangements, the microscope may comprise more than four lenses.

I claim:

1. An electron microscope comprising:
   a. an electromagnetic objective lens for producing a first electron image of an object;
   b. at least three separate electromagnetic projector lenses disposed electron optically in series for producing a magnified electron image of said first electron image; and
   c. supply means for applying excitation currents to said lenses;
   d. said supply means having a control which when operated causes the magnification of the microscope to be varied by varying the amplitudes of the excitation currents applied to at least two of said lenses the variations in amplitude being in opposite senses;
   e. whereby changes in beam rotation in said lenses are in opposite senses and tend to balance out so that the magnified image but substantially constant orientation, at least over a range of values of magnification.

2. An electron microscope according to claim 1 wherein said control has a first range of operation over which it causes the magnification of the microscope to be varied by varying the amplitudes of the excitation currents applied to a first combination of said lenses, and a second range of operation over which it causes the magnification of the microscope to be varied by varying the amplitudes of the excitation currents applied to a second, different combination of said lenses.

3. An electron microscope according to claim 1 wherein said control is operative to vary the amplitudes of said excitation currents simultaneously with each other.

4. A method of operating an electron microscope comprising an electromagnetic objective lens for producing a first electron image of an object, at least three separate electromagnetic projector lenses disposed electron optically in series for producing a magnified electron image of said first electron image, and supply means for applying excitation currents to said lenses, the method comprising the step of adjusting said supply means to vary the amplitudes of the excitation currents applied to at least two of said lenses the variations in amplitude being in opposite senses, whereby changes in beam rotation in said lenses are in opposite senses and tend to balance out so that the magnified image has substantially constant orientation.

5. A method of operating an electron microscope according to claim 4, further comprising the step of adjusting said supply means to set the net rotation of said magnified image substantially to zero.

6. A method of operating an electron microscope according to claim 4, comprising the steps of:
   a. adjusting said supply means to vary the amplitudes of the excitation currents applied to a first combination of said lenses, the variations in amplitudes being in opposite senses, whereby changes in beam rotation in said lenses are in opposite senses and tend to balance out so that the magnifiied image has a substantially constant orientation; and
   b. adjusting said supply means to vary the amplitudes of the excitation currents applied to a second, different combination of said lenses in respective opposite senses whereby changes in beam rotation in said lenses are in opposite senses and tend to balance out so that the magnified image has a substantially constant orientation.

7. A method of operating an electron microscope according to claim 4 crmprising the steps of:
   a. adjusting said supply means to vary the amplitudes of the excitation currents applied to two or more of said projector lenses to vary the magnification of the microscope; and
   b. adjusting said supply means to vary the amplitudes of the excitation current applied to the objective lens to keep the object in focus;
   c. whereby changes in beam rotation in said projector lenses and said objective lens are in opposite senses and tend to balance out so that the magnified image has a substantially constant orientation.

* * * * *

UNITED STATES PATENT OFFICE
CERTIFICATE OF CORRECTION

Patent No. 3,746,855            Dated July 17, 1973

Inventor(s) David Henry Hilditch

It is certified that error appears in the above-identified patent and that said Letters Patent are hereby corrected as shown below:

Column 5, line 22, delete "but" and substitute "has."

Signed and sealed this 27th day of November 1973.

(SEAL)
Attest:

EDWARD M. FLETCHER, JR.           RENE D. TEGTMEYER
Attesting Officer                  Acting Commissioner of Patents